United States Patent
Koh et al.

(10) Patent No.: US 10,727,525 B2
(45) Date of Patent: Jul. 28, 2020

(54) LITHIUM ION BATTERY INCLUDING SEPARATOR COATED WITH FIRE EXTINGUISHING PARTICLE

(71) Applicants: HYUNDAI MOTOR COMPANY, Seoul (KR); KIA MOTORS CORPORATION, Seoul (KR); THE INDUSTRY & ACADEMIC COOPERATION IN CHUNGNAM NATIONAL UNIVERSITY, Daejeon (KR)

(72) Inventors: Ki Seok Koh, Suwon-si (KR); Yeol Mae Yeo, Anseong-si (KR); Jung Je Woo, Goyang-si (KR); Seung Min Oh, Incheon (KR); Yoon Sung Lee, Suwon-si (KR); Kyung Jin Lee, Daejeon (KR); Hyo Jin Kim, Daejeon (KR)

(73) Assignees: HYUNDAI MOTOR COMPANY, Seoul (KR); KIA MOTORS CORPORATION, Seoul (KR); THE INDUSTRY & ACADEMIC COOPERATION IN CHUNGNAM NATIONAL UNIVERSITY, Daejeon (KR)

( * ) Notice: Subject to any disclaimer, the term of this patent is extended or adjusted under 35 U.S.C. 154(b) by 304 days.

(21) Appl. No.: 15/846,056

(22) Filed: Dec. 18, 2017

(65) Prior Publication Data
US 2018/0331386 A1    Nov. 15, 2018

(30) Foreign Application Priority Data

May 11, 2017 (KR) .................. 10-2017-0058470

(51) Int. Cl.
*H01M 10/654* (2014.01)
*H01M 2/16* (2006.01)
(Continued)

(52) U.S. Cl.
CPC ............ *H01M 10/04* (2013.01); *C08J 5/22* (2013.01); *C08J 7/04* (2013.01); *H01M 2/1653* (2013.01);
(Continued)

(58) Field of Classification Search
None
See application file for complete search history.

(56) References Cited

U.S. PATENT DOCUMENTS

2013/0143076 A1* 6/2013 Sachdev ............... H01G 11/52
429/50
2014/0120402 A1* 5/2014 Yu ........................ H01M 2/166
429/144

FOREIGN PATENT DOCUMENTS

KR    10-1676438 B1    11/2016

* cited by examiner

*Primary Examiner* — Jonathan Crepeau
(74) *Attorney, Agent, or Firm* — Brinks Gilson & Lione

(57) ABSTRACT

A lithium ion battery including a core-shell structured fire extinguishing particle is disclosed. When the battery is overheated to a predetermined temperature, a shell of the fire extinguishing particle coated on one surface or both surfaces of a porous separator is melted, a fire extinguishing material disposed in an inner space of the shell is released into an electrolytic solution of the battery, and as a result, it is possible to prevent the battery from being ignited or exploded even though the battery is overheated. Further, the melted shell clogs pores of the porous separator to block (Continued)

lithium ions from moving, such that the battery is blocked from being driven, thereby preventing the battery from being overheated any more.

14 Claims, 3 Drawing Sheets

(51) Int. Cl.
    *H01M 10/42*     (2006.01)
    *H01M 10/04*     (2006.01)
    *C08J 5/22*     (2006.01)
    *C08J 7/04*     (2020.01)
    *H01M 10/0525*     (2010.01)
    *H01M 10/613*     (2014.01)

(52) U.S. Cl.
    CPC ..... *H01M 2/1686* (2013.01); *H01M 10/0525* (2013.01); *H01M 10/4235* (2013.01); *H01M 10/613* (2015.04); *H01M 10/654* (2015.04); *C08J 2323/02* (2013.01)

LITHIUM ION BATTERY INCLUDING SEPARATOR COATED WITH FIRE EXTINGUISHING PARTICLE

CROSS-REFERENCE TO RELATED APPLICATION

This application claims under 35 U.S.C. § 119(a) the benefit of Korean Patent Application No. 10-2017-0058470 filed May 11, 2017, the entire contents of which are incorporated herein by reference.

BACKGROUND

(a) Technical Field

The present disclosure relates to a lithium ion battery including a core-shell structured fire extinguishing particle including a fire extinguishing material therein.

(b) Related Art

In order to actually apply a lithium ion battery to an electric vehicle, and the like, technical problems such as lightweight, development of a high-output, high-capacity, and high-efficiency power transmission system, and stability need to be solved. Among the technical problems, an issue about stability is directly associated with development of a high-performance battery and lightweight.

Since the lithium ion battery is vulnerable to fire such as ignition of an electrolyte when exposed to high temperature, it is essential to secure stability for the lithium ion battery to be mounted on an electric vehicle. Further, in order to achieve lightweight of a lithium ion battery, attempts have been frequently made to replace steel-based housings with a carbon fiber-reinforced plastic, and the like, which is highly likely to aggravate vulnerability of the lithium ion battery to fire.

Thus, there is an urgent need for developing a lithium ion battery which alleviates problems such as ignition and explosion in order to further enhance the stability of an electric vehicle.

REFERENCES OF THE RELATED ART

Patent Documents

Korean Patent No. 10-1676438

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with prior art, and specifically, to provide a means capable of perfectly preventing ignition, explosion, and the like of a battery when the temperature inside the battery is excessively increased, without affecting output characteristics of the battery.

The aspect of the present invention is not limited to the aforementioned object. The aspect of the present invention will be more apparent from the following description and will be realized by means described in the claims and by combinations thereof.

Aspects of the present invention may include the following configuration in order to achieve the above-described object.

In one aspect, the present invention provides a lithium ion battery including a positive electrode, a negative electrode, a porous separator disposed between the positive electrode and the negative electrode, and a fire extinguishing particle coated on one surface or both surfaces of the porous separator, in which the fire extinguishing particle is composed of a core which includes a fire extinguishing material, and a shell which is melted at a predetermined temperature.

In a preferred embodiment, the fire extinguishing material may be a phosphorus-based flame retardant which is any one of red phosphorus, phosphate, phosphonate, phosphinate, phosphine oxide, and phosphazene, or a mixture thereof.

In another preferred embodiment, the core may further include a lithium ion absorbing material which is any one of a quaternary ammonium salt, valinomycin, a valinomycin derivative, monensin, nonactin, a nonactin derivative, a tertiary amine, metal porphyrin, metal phthalocyanine, trifluoroacetophenone, a trifluoroacetophenone derivative, crown ether, dibenzo-18-crown-6, an organic phosphorus ion-sensitive material, and an organotin ion-sensitive material, or a mixture thereof.

In still another preferred embodiment, the shell may be formed by crosslinking a furan-based polymer and a maleimide derivative.

In yet another preferred embodiment, the furan-based polymer may be a polymer including a repeating unit represented by the following Chemical Formula 1.

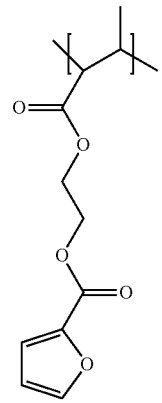

[Chemical Formula 1]

In still yet another preferred embodiment, the furan-based polymer may be any one of the polymers represented by the following Chemical Formulae 2 to 4, or a mixture thereof.

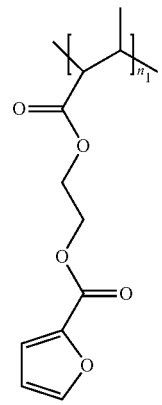

[Chemical Formula 2]

Here, $n_1$ may be 100 to 600.

[Chemical Formula 3]

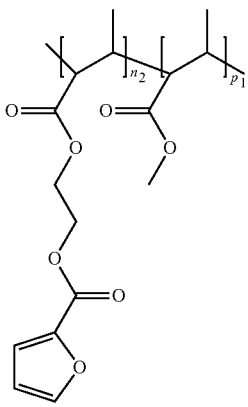

Here, $n_2$ may be 30 to 80, and $p_1$ may be 20 to 130.

[Chemical Formula 4]

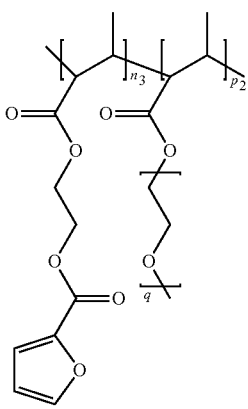

Here, $n_3$ may be 5 to 13, $p_2$ may be 3 to 8, and q may be 10 to 13.

In a further preferred embodiment, the maleimide derivative may be any one of the compounds represented by the following Chemical Formulae 5 and 6, or a mixture thereof.

[Chemical Formula 5]

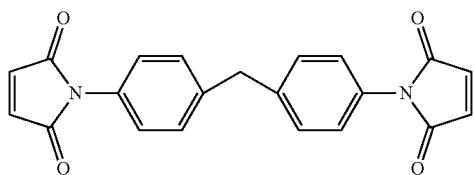

[Chemical Formula 6]

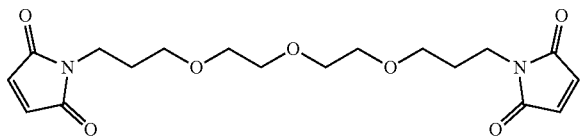

In another further preferred embodiment, the shell may be a shell in which a furan-based polymer and a maleimide derivative are crosslinked through a Diels-Alder reaction.

In still another further preferred embodiment, the shell may have a melting temperature of 100° C. to 130° C.

In yet another further preferred embodiment, the fire extinguishing particle may have a diameter of 0.1 µm to 10 µm.

In still yet another further preferred embodiment, the fire extinguishing particle may be coated to have a thickness of 0.1 µm to 10 µm on the porous separator.

Since embodiments of the present invention include the foregoing configuration, the following effects may be obtained according to the configuration.

According to a lithium ion battery including a separator coated with a fire extinguishing particle, when the temperature inside the battery is excessively increased, a shell of the fire extinguishing particle is melted to clog pores of the separator, and accordingly, the battery is blocked from being driven, thereby significantly lowering the danger of ignition, explosion, and the like. Further, as the shell is melted, the fire extinguishing material of the core is released to the outside, and as a result, the stability of the battery at high temperature is further improved.

The effects of the present invention are not limited to the aforementioned effects. The effects of the present invention are to be understood to include all the effects capable of being inferred from the following explanation.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain embodiments thereof illustrated in the accompanying drawings which are given hereinbelow by way of illustration only, and thus are not limitative of the present invention, and wherein:

FIGS. 3A to 3C are scanning electron microscope (SEM) analysis results of a fire extinguishing particle prepared by a method according to an embodiment of the present invention, in which FIG. 3A shows a fire extinguishing particle using a furoyl ethyl ether methacrylate homopolymer (FM-HO) as a furan-based polymer, FIG. 3B shows a fire extinguishing particle using a copolymer (FM-MA) of furoyl ethyl ether methacrylate and methyl methacrylate, and FIG. 3C shows is a fire extinguishing particle using a copolymer (FEEMA) of furoyl ethyl ether methacrylate and polyethylene glycol methyl ether methacrylate.

Figure 1:
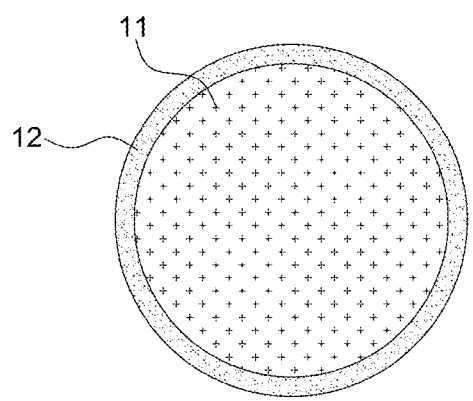
FIG. 1 schematically illustrates a configuration of a fire extinguishing particle according to embodiments of the present invention.

Reference numerals set forth in the Drawings include reference to the following elements as further discussed below:

10: fire extinguishing particle
11: core
12: shell
111: lithium ion absorbing material
20: porous separator It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with certain embodiments, it will be understood that present description is not intended to limit the invention to those embodiments. On the contrary, the invention is intended to cover not only those embodiments, but also various alternatives, modifications, equivalents and other embodiments, which may be included within the spirit and scope of the invention as defined by the appended claims.

Hereinafter, the present invention will be described in detail through Examples. The Examples of the present invention may be modified in various forms as long as the gist of the invention is not changed. However, the right scope of the present invention is not limited to the following Examples.

If it is judged that publicly known configurations and functions may obscure the gist of the present invention, the description on the publicly known configurations and functions will be omitted. The term "including" in the present specification means further including other constituent elements unless otherwise specifically described.

The lithium ion battery including a separator coated with a fire extinguishing particle, which is the present invention, is characterized by including a positive electrode, a negative electrode, and a porous separator disposed between the positive electrode and the negative electrode, in which a fire extinguishing particle having a core-shell structure is coated on one surface or both surfaces of the porous separator.

In the related art, a polyolefin-based separator or a non-woven separator is used as a separator of a lithium ion battery.

The polyolefin-based separator is prepared by manufacturing an olefin-based polymer such as polypropylene in the form of a film, and then stretching the polymer film. A polyolefin-based separator in the related art shows two behaviors as a battery is overheated. When the temperature is about 135° C., a portion of the polymer constituting a separator is melted, which causes pores of the separator to clog, and accordingly, the battery is blocked from being driven, so that a problem such as ignition and explosion does not occur. In the present specification, this phenomenon is referred to as "shut-down". However, when the temperature of the battery exceeds 135° C. and approaches approximately 150° C., the polyolefin-based separator is shrunk, and as a result, a short-circuit occurs between a positive electrode and a negative electrode, and accordingly, there still remains a problem in that the battery is ignited or exploded.

Meanwhile, the non-woven separator is a sheet or non-woven fabric, which is made of glass fiber, and since the separator is not shrunk until about 200° C., a short-circuit between electrodes does not occur, but there is a problem in that a battery continues to be overheated because the battery has no shut-down function.

The present invention has been made in an effort to solve the aforementioned problems and limitations in the related art by coating a fire extinguishing particle on one surface or both surfaces of a porous separator.

FIG. 1 schematically illustrates a fire extinguishing particle of the present invention. Referring to FIG. 1, the fire extinguishing particle is composed of a core which includes a fire extinguishing material, and a shell which is melted at a predetermined temperature as a film that surrounds the core to block the core from the outside.

Figure 2:
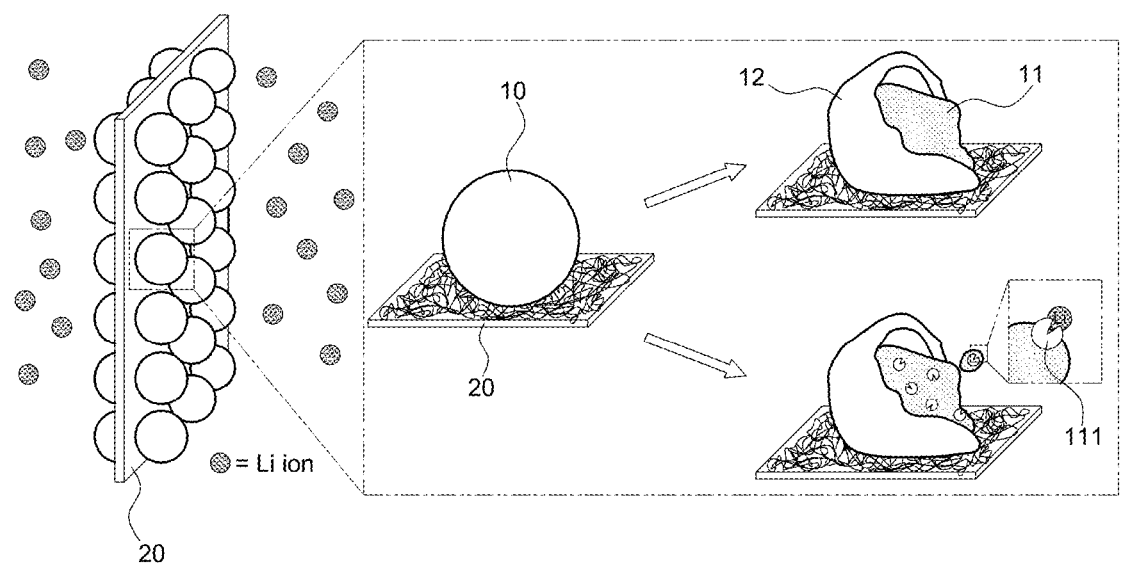
FIG. 2 schematically illustrates a behavior of the fire extinguishing particle when a lithium ion battery according to embodiments of the present invention is overheated.

FIG. 2 schematically illustrates a behavior of the fire extinguishing particle when the lithium ion battery according to embodiments of the present invention is overheated. Referring to FIG. 2, a fire extinguishing particle 10 is coated on a porous separator 20, and when the battery is overheated to a predetermined temperature or more, a shell 12 is melted, and a core 11 disposed in an inner space of the shell is exposed to the outside. That is, the fire extinguishing material included in the core is released to the outside such as an electrolytic solution, and thus prevents the battery from being ignited or exploded even though the battery is overheated.

Since the fire extinguishing particle is coated on the surface of the porous separator, the melted shell 12 clogs pores of the porous separator to block lithium ions from moving, thereby blocking the battery from being driven. That is, the melted shell performs the above-described shut-down function.

The core may further include a lithium ion absorbing material along with a fire extinguishing material, and as the core 11 is exposed to the outside, the lithium ion absorbing material captures lithium ions in an electrolyte, thereby allowing the shut-down function to be more perfectly implemented.

As described above, the lithium ion battery according to embodiments of the present invention has a technical feature in that the stability is significantly enhanced by doubly or triply preventing a problem such as ignition and explosion.

Hereinafter, each configuration of the present invention will be described in detail.

The fire extinguishing material included in the core is a phosphorus-based flame retardant, and may be any one of red phosphorus, phosphate, phosphonate, phosphinate, phosphine oxide, and phosphazene, or a mixture thereof, but is not limited thereto.

The core may further include a lithium ion absorbing material. The lithium ion absorbing material may be any one of a quaternary ammonium salt, valinomycin, a valinomycin derivative, monensin, nonactin, a nonactin derivative, a tertiary amine, metal porphyrin, metal phthalocyanine, trifluoroacetophenone, a trifluoroacetophenone derivative, crown ether, dibenzo-18-crown-6, an organic phosphorus ion-sensitive material, and an organotin ion-sensitive material, or a mixture thereof, but is not limited thereto.

Since the shell needs to be smoothly melted when the temperature inside the battery is increased, a furan-based polymer being a diene and a maleimide derivative being a dienophile may be formed of a material crosslinked through a Diels-Alder reaction. Accordingly, when the battery is overheated to a predetermined temperature or more, a retro Diels-Alder reaction occurs, and as a result, the shell may be easily melted.

The furan-based polymer may be a polymer including a repeating unit represented by the following Chemical Formula 1, and specifically, may be any one of a furoyl ethyl ether methacrylate homopolymer (hereinafter, referred to as 'FM-HO') represented by the following Chemical Formula 2, a copolymer of furoyl ethyl ether methacrylate and methyl methacrylate (hereinafter, referred to as 'FM-MA') represented by the following Chemical Formula 3, and a copolymer of furoyl ethyl ether methacrylate and polyethylene glycol methyl ether methacrylate (hereinafter, referred to as 'FEEMA') represented by the following Chemical Formula 4, or a mixture thereof.

[Chemical Formula 1]

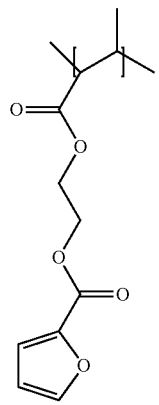

[Chemical Formula 2]

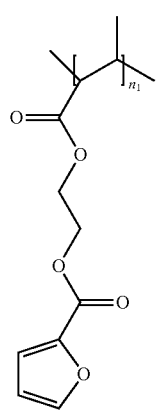

$n_1$ is 100 to 600.

[Chemical Formula 3]

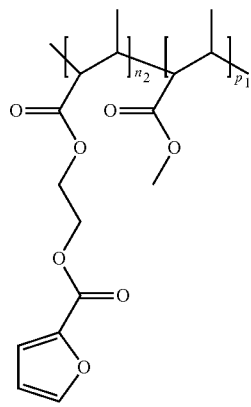

$n_2$ is 30 to 80 and $p_1$ is 20 to 130.

[Chemical Formula 4]

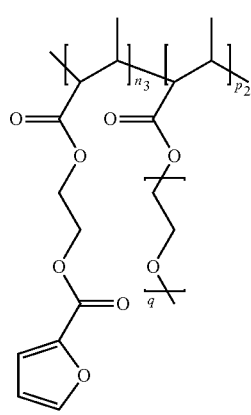

n3 may be 5 to 13, p may be 3 to 8, q may be 10 to 13, and specifically, q may be 12.

The maleimide derivative is a bismaleimide-based crosslinker, and may be any one of organically soluble 1,1'-(methylenedi-4,1-phenylene)bismaleimide (hereinafter, referred to as 'BM') represented by the following Chemical Formula 5 and a water-soluble bis-maleate-based compound represented by the following Chemical Formula 6, or a mixture thereof.

[Chemical Formula 5]

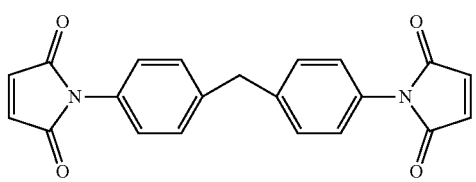

[Chemical Formula 6]

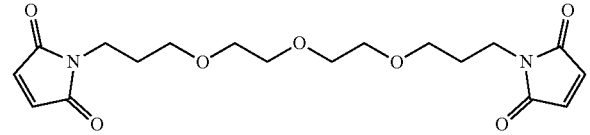

The shell may have a melting temperature of 100° C. to 130° C. The melting temperature of the shell may be adjusted through a molecular weight of the furan-based polymer and an amount of a crosslinker.

It may be preferred that the fire extinguishing particle is formed so as to have a diameter of 0.1 µm to 10 µm. When the diameter is less than 0.1 µm, the amount of the fire extinguishing material is too small, and thus the effect thereof may be minimal, and when the diameter is more than 10 µm, in the case where the fire extinguishing material is applied onto a porous separator, the thickness of the porous separator becomes extremely large, and thus there is a concern in that the performance of the lithium ion battery deteriorates.

It may be preferred that the fire extinguishing particle is coated to have a thickness of 0.1 µm to 10 µm on one surface or both surfaces of the porous separator. When the thickness is more than 10 µm, there is a concern in that the thickness of the porous separator becomes large, and as a result, the performance of the lithium ion battery may deteriorate.

The lithium ion battery according to the present invention may include a positive electrode, a negative electrode, a porous separator disposed between the positive electrode and the negative electrode and having the fire extinguishing particle coated on one surface or both surfaces thereof, and a non-aqueous or aqueous electrolyte containing a lithium salt.

The positive electrode may be obtained by applying an electrode material, which is a mixture of a positive electrode active material, a conductive material, a binder, and the like, onto a positive electrode current collector, and then drying the electrode material. Further, the negative electrode may be obtained by applying a negative electrode active material onto a negative electrode current collector, and then drying the negative electrode active material, and may be formed by further adding a conductive material, a binder, and the like to the negative electrode active material, if necessary.

The porous separator may be an insulating thin film having high ion permeability and high mechanical strength. It is possible to use a porous thin film having a pore diameter of 0.01 µm to 10 µm and a thickness of 5 µm to 300 µm, but the porous separator is not limited thereto. Further, the porous separator may be formed of an olefin-based polymer such as polypropylene having chemical resistance and h, glass fiber, and the like.

Hereinafter, a method for preparing a fire extinguishing particle according to embodiments of the present invention will be specifically described. However, the following preparation method is for exemplifying the present invention, and the right scope of the fire extinguishing particle according to embodiments of the present invention is not limited thereto.

The method for preparing a fire extinguishing particle according to an embodiment of the present invention is as follows.

(1) 6 ml of an aqueous solution including 15 wt % of gum arabic is prepared.

(2) 0.17 g of any one of the furan-based polymers represented by Chemical Formulae 2 to 4, or a mixture thereof is dissolved in 0.3 ml of chloroform being a solvent, and then the resulting solution is mixed with 0.5 g of tricresyl phosphate being a fire extinguishing material to be used as a core.

(3) 0.017 g of the organically soluble maleimide derivative represented by Chemical Formula 5 is dissolved in 0.3 ml of chloroform, and then the resulting mixture is mixed with the product of (2).

(4) While stirring the aqueous solution of (1) at 800 RPM, the product of (3) is introduced into the aqueous solution. While maintaining the stirring speed at 800 RPM, the mixture is reacted at 60° C. for 24 hours to form a core and a shell, thereby obtaining a fire extinguishing particle.

Figure 3A:
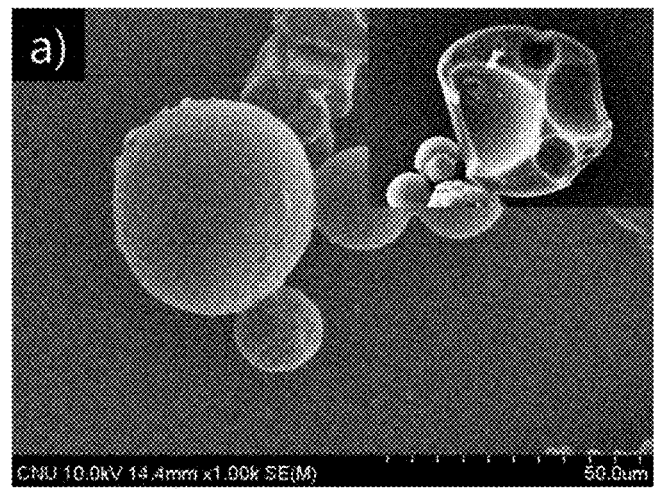
Figure 3B:
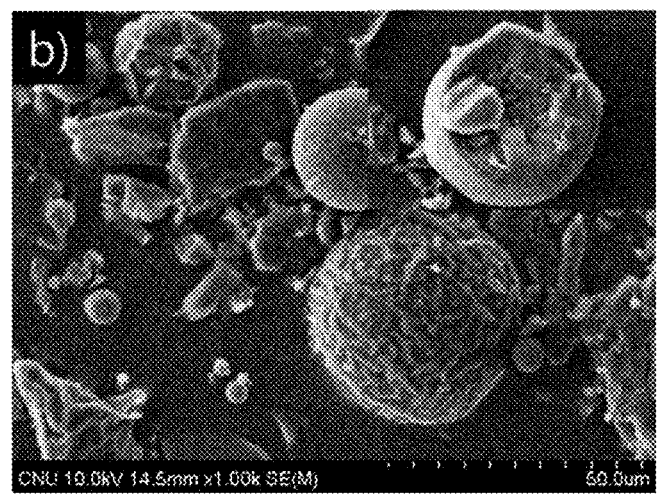
Figure 3C:

FIGS. 3A-3C show scanning electron microscope (SEM) analysis results of the fire extinguishing particle prepared by the aforementioned method. Specifically, FIG. 3A is a fire extinguishing particle in which the FM-HO is used as a furan-based polymer, FIG. 3B is a fire extinguishing particle in which the FM-MA is used, and FIG. 3C is a fire extinguishing particle in which the FEEMA is used. Referring to FIGS. 3A-3C, it can be confirmed that the fire extinguishing particle has a core-shell structure.

The method for preparing a fire extinguishing particle according to another embodiment of the present invention is as follows.

(1) 0.017 g of an aqueous maleimide derivative represented by Chemical Formula 6 is dissolved in 6 ml of an aqueous solution including 15 wt % of gum arabic.

(2) 0.17 g of any one of the furan-based polymers represented by Chemical Formulae 2 to 4, or a mixture thereof is dissolved in 0.3 ml of chloroform being a solvent, and then the resulting solution is mixed with 0.5 g of tricresyl phosphate being a fire extinguishing material to be used as a core.

(3) While stirring the aqueous solution of (1) at 800 RPM, the product of (2) is introduced into the aqueous solution. While maintaining the stirring speed at 800 RPM, the mixture is reacted at 60° C. for 24 hours to form a core and a shell, thereby obtaining a fire extinguishing particle.

The Test Examples and Examples of the present invention have been described in detail as described above, but the right scope of the present invention is not limited to the above-described Test Examples and Examples, and various modifications and improvements made by the person skilled in the art and using the basic concepts of the present invention defined in the following claims also fall within the right scope of the present invention.

Features of the invention have been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A lithium ion battery comprising:
 a positive electrode;
 a negative electrode:
 a porous separator disposed between the positive electrode and the negative electrode; and
 a fire extinguishing particle coated on one surface or both surfaces of the porous separator,
 wherein the fire extinguishing particle is composed of a core which comprises a fire extinguishing material, and a shell which is melted at a predetermined temperature,
 wherein the shell is formed by crosslinking a furan-based polymer and a maleimide derivative.

2. The lithium ion battery of claim 1, wherein the fire extinguishing material is a phosphorus-based flame retardant selected from the group consisting of red phosphorus, phosphate, phosphonate, phosphinate, phosphine oxide, phosphazene, and combinations thereof.

3. The lithium ion battery of claim 1, wherein the core further comprises a lithium ion absorbing material selected from the group consisting of a quaternary ammonium salt, valinomycin, a valinomycin derivative, monensin, nonactin, a nonactin derivative, a tertiary amine, metal porphyrin, metal phthalocyanine, trifluoroacetophenone, a trifluoroacetophenone derivative, crown ether, dibenzo-18-crown-6, an organic phosphorus ion-sensitive material, an organotin ion-sensitive material, and combinations thereof.

4. The lithium ion battery of claim 1, wherein the furan-based polymer is a polymer comprising a repeating unit represented by the following Chemical Formula 1

[Chemical Formula 1]

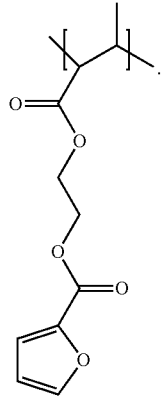

5. The lithium ion battery of claim 1, wherein the furan-based polymer is at least one selected from the group consisting of polymers represented by the following Chemical Formulae 2 to 4 and combinations thereof:

[Chemical Formula 2]

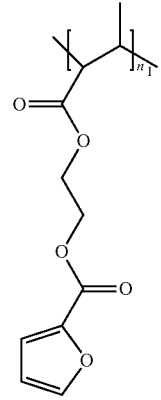

$n_1$ is 100 to 600

[Chemical Formula 3]

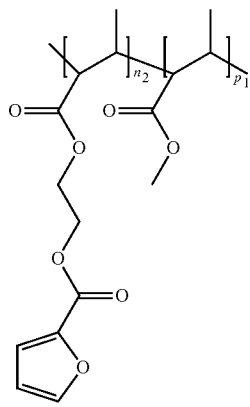

$n_2$ is 30 to 80 and $p_1$ is 20 to 130, and

[Chemical Formula 4]

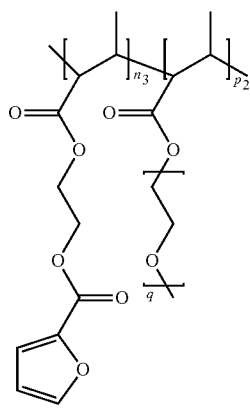

$n_3$ is 5 to 13, $p_2$ is 3 to 8, and q is 10 to 13.

6. The lithium ion battery of claim 1, wherein the maleimide derivative is at least one selected from the group consisting of compounds represented by the following Chemical Formulae 5 and 6, and a combination thereof

[Chemical Formula 5]

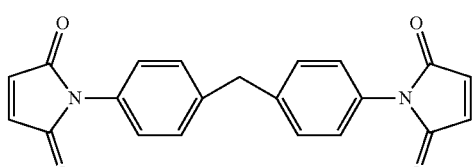

[Chemical Formula 6]

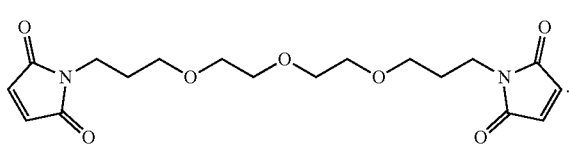

7. The lithium ion battery of claim 1, wherein the shell is a shell in which a furan-based polymer and a maleimide derivative are crosslinked through a Diels-Alder reaction.

8. The lithium ion battery of claim 1, wherein the shell has a melting temperature of 100° C. to 130° C.

9. The lithium ion battery of claim 1, wherein the fire extinguishing particle has a diameter of 0.1 μm to 10 μm.

10. The lithium ion battery of claim 1, wherein the fire extinguishing particle is coated to have a thickness of 0.1 μm to 10 μm on the porous separator.

11. A lithium ion battery comprising:
a positive electrode;
a negative electrode;
a separator comprising glass fiber and interposed between the positive electrode and the negative electrode, the separator comprising a first surface facing the positive electrode and a second surface facing the negative electrode; and
a flame retardant layer formed on at least one of the first surface and the second surface, the flame retardant layer comprising a plurality of particles,
wherein at least part of the plurality of particles individually has a core-shell structure comprising a core and a shell encapsulating the core,
wherein the core comprises a fire extinguishing material and a lithium ion absorbing material,
wherein the fire extinguishing material is a phosphorus-based flame retardant selected from the group consisting of red phosphorus, phosphate, phosphonate, phosphinate, phosphine oxide, phosphazene, and combinations thereof,
wherein a lithium ion absorbing material being selected from the group consisting of a quaternary ammonium salt, valinomycin, a valinomycin derivative, monensin, nonactin, a nonactin derivative, a tertiary amine, metal porphyrin, metal phthalocyanine, trifluoroacetophenone, a trifluoroacetophenone derivative, crown ether, dibenzo-18-crown-6, an organic phosphorus ion-sensitive material, an organotin ion-sensitive material, and combinations thereof,
wherein the shell comprises a structure made from crosslinking of a furan-based polymer and a maleimide derivative, the shell being configured to release the lithium ion absorbing material of the core at a temperature higher than a predetermined temperature.

12. The battery of claim 11, wherein the furan-based polymer is a polymer comprising a repeating unit represented by the following Chemical Formula 1

[Chemical Formula 1]

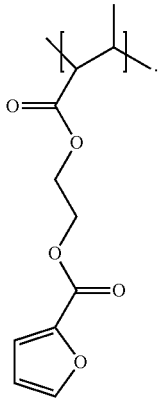

13. The battery of claim 11, wherein the furan-based polymer is one selected from the group consisting of polymers represented by the following Chemical Formulae 2 to 4 and combinations thereof:

[Chemical Formula 2]

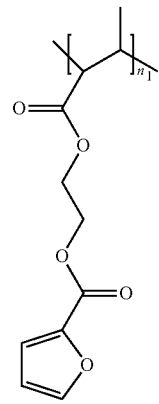

$n_1$ is 100 to 600,

[Chemical Formula 3]

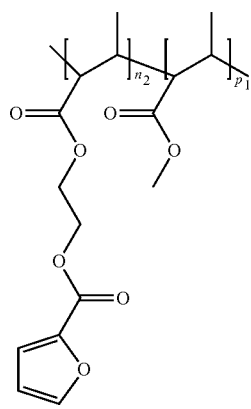

$n_2$ is 30 to 80 and $p_1$ is 20 to 130, and

[Chemical Formula 4]

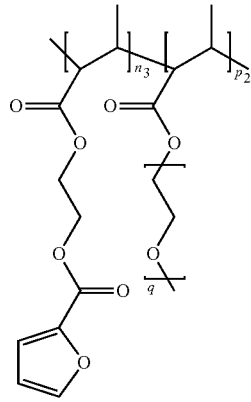

$n_3$ is 5 to 13, $p_2$ is 3 to 8 and q is 10 to 13.

14. The lithium ion battery of claim 11, wherein the maleimide derivative is at least one selected from the group consisting of compounds represented by the following Chemical Formulae 5 and 6, and a combination thereof

[Chemical Formula 5]
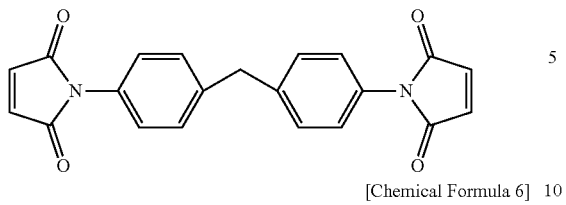
[Chemical Formula 6]
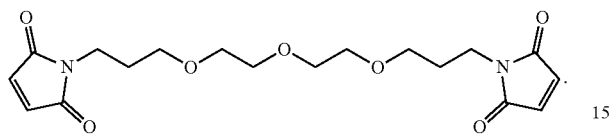
* * * * *